(12) United States Patent
Åsbogård et al.

(10) Patent No.: US 10,962,106 B2
(45) Date of Patent: Mar. 30, 2021

(54) DEVICE AND A METHOD FOR GEAR SHIFT COORDINATION

(71) Applicant: VOLVO TRUCK CORPORATION, Gothenburg (SE)

(72) Inventors: Mattias Åsbogård, Mölnlycke (SE); Jonas Jerrelind, Hovås (SE); Erik Lauri, Mölndal (SE)

(73) Assignee: VOLVO TRUCK CORPORATION, Göteborg (SE)

(*) Notice: Subject to any disclaimer, the term of this patent is extended or adjusted under 35 U.S.C. 154(b) by 25 days.

(21) Appl. No.: 16/462,304

(22) PCT Filed: Nov. 25, 2016

(86) PCT No.: PCT/EP2016/078895
§ 371 (c)(1),
(2) Date: May 20, 2019

(87) PCT Pub. No.: WO2018/095543
PCT Pub. Date: May 31, 2018

(65) Prior Publication Data
US 2019/0368604 A1    Dec. 5, 2019

(51) Int. Cl.
*F16H 61/04* (2006.01)
*B60K 1/02* (2006.01)
(Continued)

(52) U.S. Cl.
CPC ........... *F16H 61/0437* (2013.01); *B60K 1/02* (2013.01); *B60K 17/354* (2013.01);
(Continued)

(58) Field of Classification Search
CPC .. F16H 61/0437; F16H 61/04; F16H 61/0213; F16H 61/0202; F16H 3/02;
(Continued)

(56) References Cited

U.S. PATENT DOCUMENTS 2,004,749 A     6/1935  Hugh
3,572,176 A *   3/1971  Bildat ................... B60W 10/10
                                                          477/2
(Continued)

FOREIGN PATENT DOCUMENTS

CN       1918025 A     2/2007
CN     104154226 A    11/2014
(Continued)

OTHER PUBLICATIONS

Chinese Office Action dated Apr. 7, 2020, in corresponding Chinese Application No. 201680091138.4, 68 pages.
(Continued)

*Primary Examiner* — John D Walters
(74) *Attorney, Agent, or Firm* — Venable LLP; Jeffri A. Kaminski

(57) ABSTRACT

The invention relates to a drive arrangement for a vehicle and a method for gear shifting in a vehicle. The drive arrangement (5) comprises at least a first drive axle (10, 20, 30) operatively connected to a first gear box (11) and a first propulsion unit (12). The drive arrangement (5) further comprises a second gear box (21) and a second propulsion unit (22) operatively connected to the first drive axle (10) or to an optional second drive axle (20, 30). The drive arrangement (5) further comprises at least one electronic control unit (ECU) adapted to govern gear transmission of the first and the second gear boxes (11, 21). The electronic control unit (ECU) is configured to automatically select between shifting gear on the first and the second gear boxes (11, 21) simultaneously, or sequentially. The drive arrangement and the method provides for a very versatile drive arrangement and gear synchronization providing comfort for the driver and the passengers as well as improved vehicle dynamics.

15 Claims, 8 Drawing Sheets

(51) Int. Cl.
*B60K 17/354* (2006.01)
*B60K 17/356* (2006.01)
*B62D 61/10* (2006.01)
*F16H 3/02* (2006.01)
*F16H 61/02* (2006.01)
*B60K 1/00* (2006.01)

(52) U.S. Cl.
CPC .......... *B60K 17/356* (2013.01); *B62D 61/10* (2013.01); *F16H 3/02* (2013.01); *F16H 61/0213* (2013.01); *B60K 2001/001* (2013.01); *B60Y 2200/143* (2013.01); *B60Y 2200/90* (2013.01); *F16H 2306/20* (2013.01); *F16H 2708/22* (2013.01)

(58) Field of Classification Search
CPC ...... B60K 1/02; B60K 17/354; B60K 17/356; B62D 61/10
USPC ........................................... 180/65.6
See application file for complete search history.

(56) References Cited

U.S. PATENT DOCUMENTS

| | | | |
|---|---|---|---|
| 4,923,025 A * | 5/1990 | Ellers | B60W 10/02 180/65.23 |
| 5,879,265 A | 3/1999 | Bek | |
| 6,688,412 B2 * | 2/2004 | Kima | B60K 17/356 180/65.51 |
| 10,272,899 B2 * | 4/2019 | Simonini | B60W 10/08 |
| 2002/0023791 A1 | 2/2002 | Kima et al. | |
| 2004/0200648 A1 | 10/2004 | Tarasinski et al. | |
| 2005/0028640 A1 | 2/2005 | Laurent et al. | |
| 2008/0119315 A1 * | 5/2008 | Lawson | B60K 6/365 475/6 |
| 2011/0259657 A1 | 10/2011 | Fuechtner | |
| 2011/0287888 A1 | 11/2011 | Muller et al. | |
| 2015/0307086 A1 * | 10/2015 | Ketfi-Cherif | B60W 10/08 701/22 |
| 2016/0046193 A1 | 2/2016 | Park | |

FOREIGN PATENT DOCUMENTS

| | | |
|---|---|---|
| CN | 106143206 A | 11/2016 |
| WO | 15182943 A1 | 12/2015 |

OTHER PUBLICATIONS

International Search Report dated Aug. 30, 2017 in International Application No. PCT/EP2016/078895.
International Preliminary Report on Patentability dated Nov. 7, 2018 in International Application No. PCT/EP2016/078895.

\* cited by examiner

DEVICE AND A METHOD FOR GEAR SHIFT COORDINATION

TECHNICAL FIELD

The invention relates to a drive arrangement for a vehicle and a method for gear shifting in a vehicle using a drive arrangement. The drive arrangement comprises at least two gear boxes operatively connected to one or more drive axles. The gear boxes maybe governed to shift gear following a selected sequence or procedure. The drive arrangement and the method disclosed herein may be applied in heavy-duty vehicles, such as trucks, buses, wheel loaders, articulated haulers, excavators, backhoe loaders and construction equipment. Although the invention will be described with respect to a bus, the invention is not restricted to this particular vehicle, but may also be used in other vehicles having multiple gear boxes operatively connected to one or more drive axles.

BACKGROUND

Vehicles having multiple gear boxes operatively connected to two or more drive axles such as electrical vehicles may include the possibility to govern the gear shifting sequentially. Vehicles comprising two driving wheels each equipped with a traction chain comprising an electric motor, a gear change mechanism may be operated to offset over time the gear shifting on the two driving wheels. This is said to carry out a gear change in a gentle manner. One such vehicle and a method for controlling the gear change in the vehicle are disclosed in the published US patent application no. US 2005/0028640A1, assigned to Conception ET Development Michelin S.A. The method carries out a sequence in which the gear of a first drive axle is switched to neutral; the revolution speed of the electric motor is synchronized and engaged with the intended gear on the operated wheel. In a successive phase the gear is changed on the remaining driving wheel.

In the US patent application no. US 2004/0200648 A1 a drive system for a vehicle is disclosed. The vehicle has a drive train comprising at least a first drive wheel and a second wheel and a gear box that can be shifted between at least two speed transmission steps. To avoid vehicle speed drops while shifting gear the drive system applies a greater propulsive torque on the drive motor driving the first wheel, shifts gear, and subsequently lowers the propulsive torque of the drive motor driving the first wheel.

The just mentioned disclosures provide for smooth gear changes but do not provide versatile solutions which can be implemented in a vehicle without considerable efforts. The proposed solutions further do not address the problems arising from scenarios in which a driver may need to impart high propulsive torque.

There is thus a need for improving performance, comfort and driveability of vehicles equipped with one or more drive axles such as drive axles driven by electrical motors. More specifically, it appears to be a need to address power or acceleration interrupts during gear-shifting.

SUMMARY

An object of the invention is to provide a drive arrangement and a method for gear shifting in a vehicle using a drive arrangement. The object is achieved by a drive arrangement and a method according to claims.

By the provision of a drive arrangement for a vehicle, the drive arrangement comprises at least a first drive axle operatively connected to a first gear box and a first propulsion unit. The drive arrangement further comprises a second gear box and a second propulsion unit operatively connected to the first drive axle or to an optional second drive axle. The drive arrangement further comprises at least one electronic control unit adapted to govern gear transmission of the first and the second gear boxes. The electronic control unit is configured to automatically shift gear on the first and the second gear boxes simultaneously and to automatically shift gear on the first and the second gear boxes sequentially.

The drive arrangement provides for a versatile drive arrangement which automatically can switch between simultaneous gear shifting or sequential gear shifting. By having the choice to switch between different gear shifting modes, the comfort for the driver and the passengers may be improved. The dynamic properties of the vehicle may further be improved by selecting between simultaneous gear shifting and sequential gear shifting. There is a huge difference between driving on a road with relatively bad tyre grip such as an icy road, as compared to a dry tarmac road with relatively good tyre grip. By means of a drive arrangement according to the present disclosure, the driver is assisted by the selective decisions taken by the drive arrangement to shift gear simultaneously or sequentially. The drive arrangement further enables simultaneous and sequential gear shifting, i.e. specific gear shift sequence or procedure may be performed.

Just as a matter of example, the sequential gear shifting may be performed during acceleration or retardation, and/or, simultaneous gear shifting may be performed or initiated during free-rolling and/or when being in a stand still position.

If the vehicle is an articulated vehicle such as bi-articulated buss, or any multi-articulated vehicle, selecting between simultaneous gear shifting and sequential gear shifting may be extra favourable. Not only does it provide comfort for the driver and the passengers but as articulated vehicles may in some scenarios be more sensitive to how and when the propulsive torque is applied. By automatically select between simultaneous or sequential gear shifting, the dynamic properties of an articulated vehicle may be governed and even improved.

Although a drive arrangement may be described, the features and the functions of the drive arrangements may optionally be applicable to the method described herein. Likewise, although a method may be described herein, the disclosure may include structural features which may optionally be applicable on the drive arrangement disclosed herein.

A second drive axle may be operatively connected to the second gear box and the second propulsion unit. The drive arrangement may thus comprise one or more drive axles such as two or more, three or more, four or more, each drive axle is operatively connected to a gear box and a propulsion unit. By provision of such drive arrangement, a very versatile drive arrangement is provided which enables the modification to a suitable gear shifting sequence or procedure specifically adapted for the present scenario or environment.

The first and the second gear boxes may be stepped transmission gear boxes. Stepped transmission gear boxes provide good possibilities for adapting suitable gear shift sequences or procedures.

The propulsion units may be electrical motors. It has been found that the drive arrangement according to the present disclosure is suitable in electrical vehicles, i.e. vehicles having electrical motors as main or exclusive propulsion units. The propulsion units may however be combustion engines, or hybrid motors, combinations of different types of propulsion units are of course possible such as combinations of electrical motors and combustion engines.

As mentioned above, the drive arrangement may comprise one or more drive axles. Just as a matter of example, the drive arrangement may comprise at least a third drive axle. The third drive axle is operatively connected to a third gear box and a third propulsion unit. When having three drive axles, two drive axles are preferably rear drive axles. The drive arrangement may thus be provided with a front drive axle and at least two rear drive axles, each drive axle being operatively connected to a gear box and a propulsion unit. The drive arrangement is thus versatile in terms of that it can be adapted to substantially any vehicle, especially heavy-duty vehicles such as trucks or busses.

The electronic control unit may be configured to shift gear on at least the first and the second gear boxes simultaneously and sequentially thereafter shift gear on the third gear box. The drive arrangement not only enables the option of selecting between a simultaneous gear shift and a sequential gear shift, but also combinations thereof. It should be noted that a combination of a simultaneous gear shift and a sequential gear shift is per definition a sequential gear shift although the gear on two or more gear boxes are shifted simultaneously and on one or more of the remaining gear boxes the gear is shifted either before or after the simultaneous gear shift. The gear boxes may in this manner be shifted in sequence but within the sequence there are gear boxes that shifts gear simultaneously, until all gears are shifted. Again, this provides a very versatile drive arrangement which may be adapted to prioritize either comfort, speed or vehicle dynamic properties for example.

If the drive arrangement comprises a third gear box, the electronic control unit may be configured to shift gear on the third gear box and sequentially thereafter shift gears on the first and the second gear boxes simultaneously. In such an embodiment, the gear shift sequence may be represented as 1+2, i.e. firstly one gear box shifts gear and subsequently thereafter two gear boxes shifts gear simultaneously. By implementing gear shift sequences, the drive arrangement becomes even more versatile. In an embodiment, the ECU may thus be configured to shift gear following a selected gear shift sequence. The electronic control unit may be configured to selectively shift gear on a pair of gear boxes simultaneously for example. Such gear shift sequence may be represented as 1+2 as mentioned above. Just as a matter of example, other gear shifts sequences may be represented as 1+2, 2+2, 1+3, 1+4, 2+3 or 3+3 just to mention a few.

The drive arrangement may comprise at least one sensor and the electronic control unit is operatively connected to the at least one sensor. By means of at least one sensor, the drive arrangement may be responsive to input data. The at least one sensor may be adapted to detect a prevailing condition such as a prevailing vehicle condition, and wherein the electronic control unit is configured to select between shifting gear simultaneously, or sequentially, dependent on the detected prevailing condition.

The prevailing condition may be based on one or more of the following conditions; acceleration, retardation, vehicle speed, amount of propulsive torque applied, gear status, vehicle dynamics, ambient environment conditions, steering angle, joint angle, amount of applied brake torque or the like. The drive arrangement is thus responsive to a selected or detected condition and may force the gear boxes to shift gear in response to the selected or detected condition.

The prevailing condition triggering a simultaneous gear shift on at least two gear boxes, optionally on all of the gear boxes, may be one or more of the following conditions: The vehicle is free-rolling and no propulsive torque is applied and subsequently propulsive torque is applied. High propulsive torque is applied on a predetermined gear, e.g. a low gear, and subsequently no propulsive torque is applied. The vehicle is in a stand still position and propulsive torque is applied. The vehicle is in a standstill position. The vehicle is turning and propulsive torque is applied. The vehicle is free rolling. The vehicle sensors indicate a tyre friction below a predetermined value or threshold level.

The at least one sensor may be one or more sensors selected from the list of; LIDAR, sonar, radar, IR, camera, GPS device, temperature sensor, tilt sensor, accelerometer, gyrometer, autonomous vehicle drive sensors, steering sensor such as combo sensor steering-torque, HVAC sensor, throttle position sensor, transmission sensor, brake position sensor, headlight range sensor, steering angle sensor, chassis level sensor, brake wear sensor, mirror sensor, passive wheel speed sensor accelerator pedal angle sensor, cross traffic alert, radar such as rear of front radar, rear or front laser radar, tire pressure sensor, collision sensor, pedestrian warning IR sensor, front object radar, drowsiness sensor, ASCD, front object camera, night vision, lane departure sensor, energy storage monitoring unit, GPS, DGPS, 802.11p based sensor, front camera, rear camera, side camera, wheel encoder, ultrasonic sensor, gyroscope, transmission sensor, coolant sensor, oxygen sensor, mass or vane air flow sensor, speed sensor, EGR position sensor, engine oil and temperature sensor, or the like. As can be gleaned, the vehicles own sensors may advantageously be used to provide input data providing the ECU with information to decide upon a suitable gear shift mode, i.e. to decide if a simultaneous gear shift or a sequential gear shift should be performed.

The prevailing condition may be determined as a condition imposed on the vehicle within a predetermined amount of time such as within 10 seconds, 5 seconds or 3 seconds. Just as a matter of example, the GPS unit may provide data to the ECU that the vehicle is about to climb a steep slope. Having access to the vehicle speed and distance to the slope, the ECU may decide that it may be advantageous to prioritize speed and accessibility to propulsive torque rather than a comfortable and smooth drive, hence the ECU orders a simultaneous gear shift.

The first drive axle may be a front steering axle and the second drive axle may be a first rear axle. If the drive arrangement comprises an additional third drive axle, the third drive axle may be a second rear axle. Without being bound by theory, it is believed that the drive arrangement is specifically useful for drive arrangement having three or more drive axles. At least the first and the second drive axles may be parallel drive axles; preferably all drive axles are parallel drive axles. The drive arrangement may however be provided with two aligned drive axles, i.e. two drive axles rotating about the same rotation axis.

At least the first and the second drive axles may each be operatively connected with a first and a second wheel. Each drive axle of the drive arrangement may be operatively connected to a wheel.

According to a second aspect of the present disclosure, the present disclosure also relates to a method for gear shifting in a vehicle. By the provision of a method for gear shifting in a vehicle, the vehicle comprising a drive arrangement comprising at least a first drive axle. The first drive axle is operatively connected to a first gear box and a first propulsion unit. The drive arrangement further comprising a second gear box and a second propulsion unit operatively connected to the first drive axle, or to an optional second drive axle. The drive arrangement further comprises at least one electronic control unit adapted to govern gear transmission of the first and the second gear boxes. The method comprises automatically selecting between shifting gear on the first and the second gear boxes simultaneously, or sequentially.

The method provides for a versatile method which automatically can switch between simultaneous gear shifting or sequential gear shifting. By having the choice to switch between different gear shifting modes, the comfort for the driver and the passengers is improved. The dynamic properties of the vehicle may further be improved by selecting between simultaneous gear shifting and sequential gear shifting. There is a huge difference between driving on a road with relatively bad tyre grip such as an icy road, as compared to a dry tarmac road with relatively good tyre grip. By means of a method according to the present disclosure, the driver is assisted by the selective decisions made by means of the method to shift gear simultaneous or sequentially. The method further enables simultaneous and sequential gear shifting, i.e. specific gear shift sequences may be performed. If the vehicle is an articulated vehicle such as bi-articulated buss, or any multi-articulated vehicle, selecting between simultaneous gear shifting and sequential gear shifting may be extra favourable. Not only does it provide comfort for the driver and the passengers but as articulated vehicles may in some scenarios be more sensitive to how and when the propulsive torque is applied. By automatically select between simultaneous or sequential gear shifting, the dynamic properties of an articulated vehicle may be governed and even improved.

The drive arrangement may further comprise at least one sensor operatively connected to the electronic control unit and adapted to detect a prevailing condition. The method may further comprise selecting between shifting gear on the first and the second gear boxes simultaneously, or sequentially, dependent on the detected prevailing condition. This makes the vehicle on which the method is implemented on very responsive enabling it to adapt to the specific environment and to select between the prioritized parameters.

The drive arrangement may comprise a third drive axle; the third drive axle is operatively connected to a third gear box and a third propulsion unit. The method may comprise shift gears on at least the first and the second gear boxes simultaneously, and sequentially thereafter shift gear on the third gear box. Optionally or additionally, the method comprises shift gear on the third gear box and sequentially thereafter shift gears on the first and the second gear boxes simultaneously. The ECU may thus be configured to shift gear following a selected gear shift sequence as disclosed above for example. Just as a matter of example, the electronic control unit may be configured to selectively shift gear on a pair of gear boxes simultaneously. Such gear shift sequence may be represented as 1+2 as mentioned above. With this configuration comprising three drive axles other gear shifts sequences may be represented such as; 1+2, 2+2, 1+3, 2+3 or 3+3 just to mention a few. Shifting gear may be implemented by selectively shift gear on a pair of gear boxes simultaneously. If a configuration comprises more than 3 drive axles then other additional shift sequences can be present.

Just as a matter of example, other gear shifts sequences may be represented as 1+2, 2+2, 1+3, 1+4, 2+3 or 3+3 just to mention a few. Generally, the total numbers of gear boxes are preferably equal to the sum of a gear shift sequence. It should be noted that deviations may occur. Just as a matter of example, it may be possible to have x number of gear boxes and still have the sum of a gear shift sequence equal to x−1, x, or x+1. For example, a vehicle has four gear boxes and shifts gear on a first gear box and subsequently thereafter shifts gear on all four gear boxes. The gear sequence would thus be 1+4 while the total number of gear boxes would be only 4. Shifting gear may be implemented by selectively shift gear on a pair of gear boxes simultaneously.

The prevailing condition triggering a simultaneous gear shift may be one or more of the following conditions: The vehicle is free-rolling and no propulsive torque applied and subsequently propulsive torque is applied. High propulsive torque is applied on a low gear and subsequently no propulsive torque is applied. The vehicle is in a stand still position and propulsive torque is applied. The vehicle is free rolling. The vehicle is in a stand still position. The vehicle is turning and propulsive torque is applied or the vehicle sensors indicate a tyre friction below a predetermined value or threshold level.

The prevailing condition triggering a sequential gear shift may be one or more of the following conditions: The vehicle is turning and propulsive torque is applied. The vehicle sensors indicate a tyre friction below a predetermined value or a threshold level. The vehicle is accelerating. The vehicle is decelerating.

According to an aspect, the present disclosure also relates to a computer program comprising program code means for performing the steps of one or more of the methods disclosed herein, when the program is run on a computer.

According to an aspect, the present disclosure also relates to a computer readable medium carrying a computer program comprising program code means for performing the steps of one or more of the methods disclosed herein when the program product is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
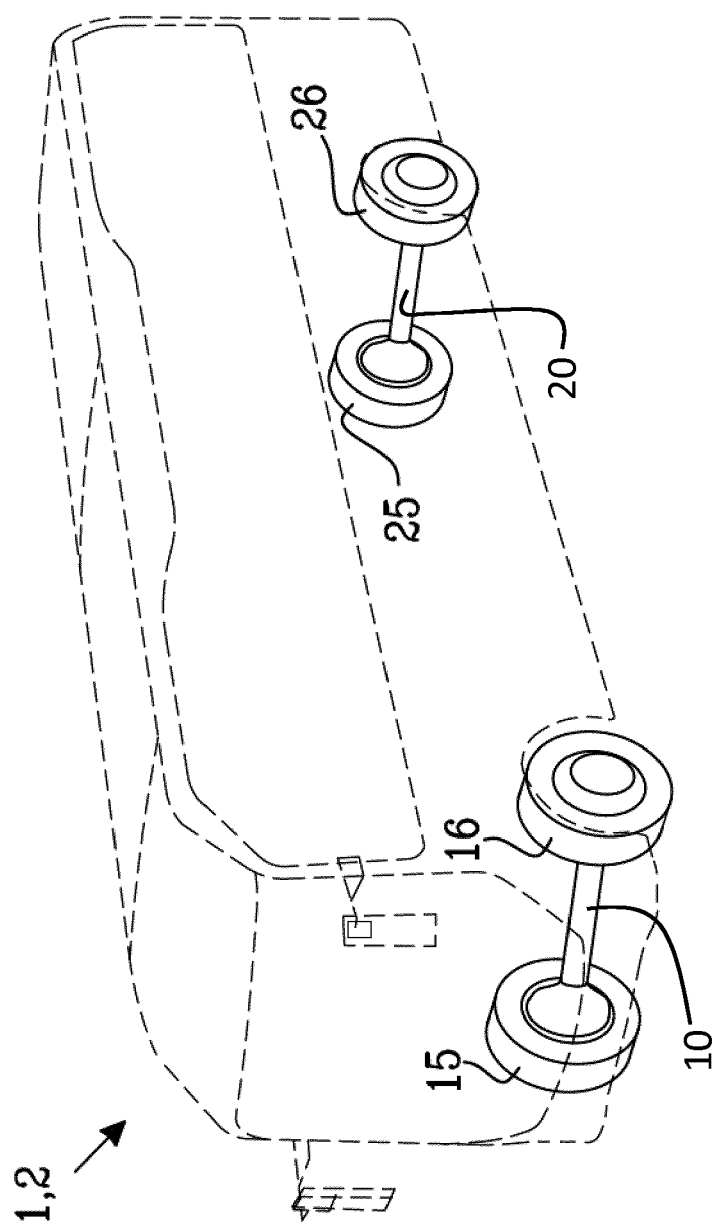
FIG. 1 is a schematic view of a vehicle, in this case an electric bus.

FIG. 1 shows a vehicle 1 which in the shown embodiment is a bus 2. It should be noted that although the disclosure relates to a bus, the disclosure is not restricted to this particular vehicle, but also relates to other vehicles such as heavy-duty vehicles, such as trucks, construction equipment, fork lifters and so forth. The vehicle may be electrical, hybrid, such as hybrid electric, or combustion engine propelled. The bus 2 is an electrical bus having a first and a second axle 10, 20 each associated with a first and a second wheel 15, 16, 25, 26. The drive arrangement of the bus 2 is shown in FIG. 2 in greater detail.

Figure 2:
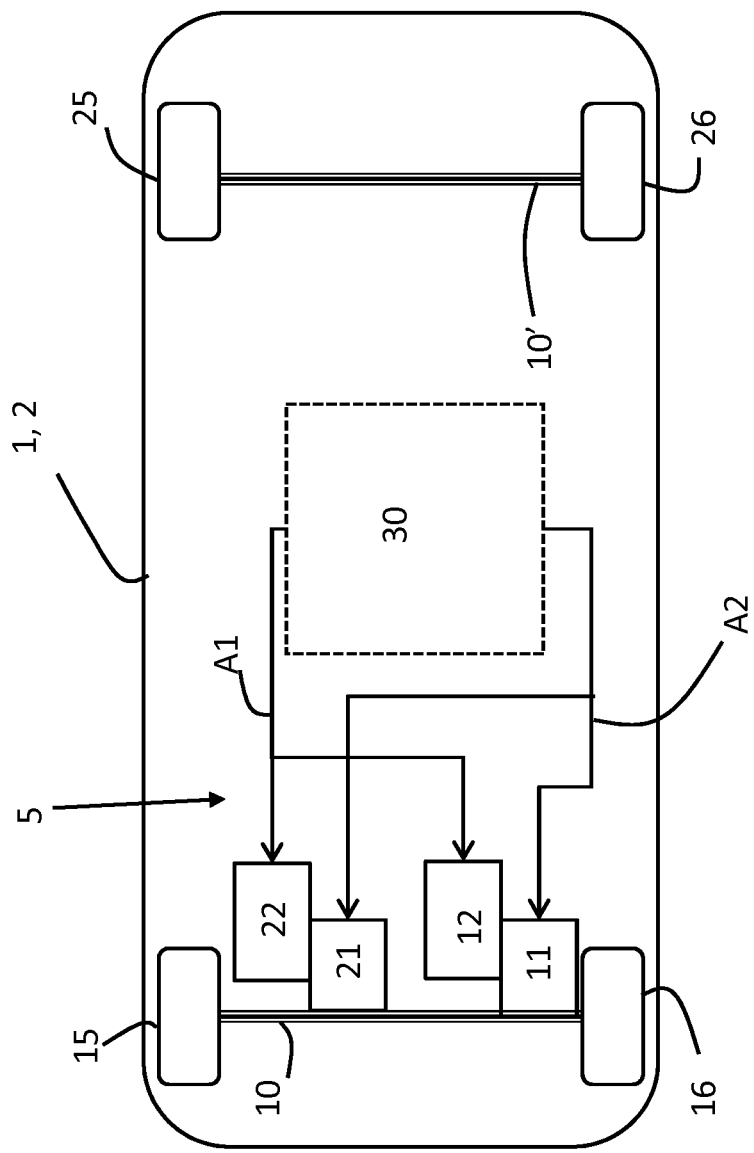
FIG. 2 is a schematic view of a vehicle having a drive arrangement with a single drive axle.

FIG. 2 shows the drive arrangement 5 of the vehicle 1. The drive arrangement 5 comprises a first drive axle 10 and a second axle 10' each associated with a first and a second wheel 15, 16, 25, 26. The first drive axle 10 comprises a gear box 11 and a propulsion unit 12. The first drive axle 10 is further operatively connected to a second gear box 21 and a second propulsion unit 22. The gear boxes may be planetary gear transmissions or standard step geared transmissions. The propulsion units 12, 22 are in this case electrical motors. The first drive axle 10 is thus associated with two propulsion units 12, 22 which output power is directed to the first drive axle 10 via respective gear boxes 11, 21.

As will be understood when reading the disclosure, the vehicle may be provided with one or more drive axles. The vehicle shown in FIG. 2 has one drive axle and one passive axle. As will be described below, a vehicle may be provided with two or more drive axles, such as three, four, five, six or more drive axles. By the term "drive axle" as used herein is meant that the axle is operatively connected to at least one propulsion unit, i.e. that propulsive torque can be applied to the drive axle in order to rotate a propulsion member such as an associated wheel or crawler (not shown).

The vehicle 1 further comprises an electronic control system 30. The drive arrangement 5 is configured to automatically select between shifting gear on the first and the second gear boxes 11, 21 simultaneously, or sequentially. The drive arrangement 5 thus permits the vehicle 1 to be driven by both the propulsion units 12, 22 simultaneously or separately. The drive arrangement 5 further enables an automated selection between the gear shifting functions; shifting gear on the first and the second gear boxes simultaneously, or sequentially. In practise the drive arrangement can prompt the gear boxes to shift gear simultaneously or sequentially.

Figure 3:
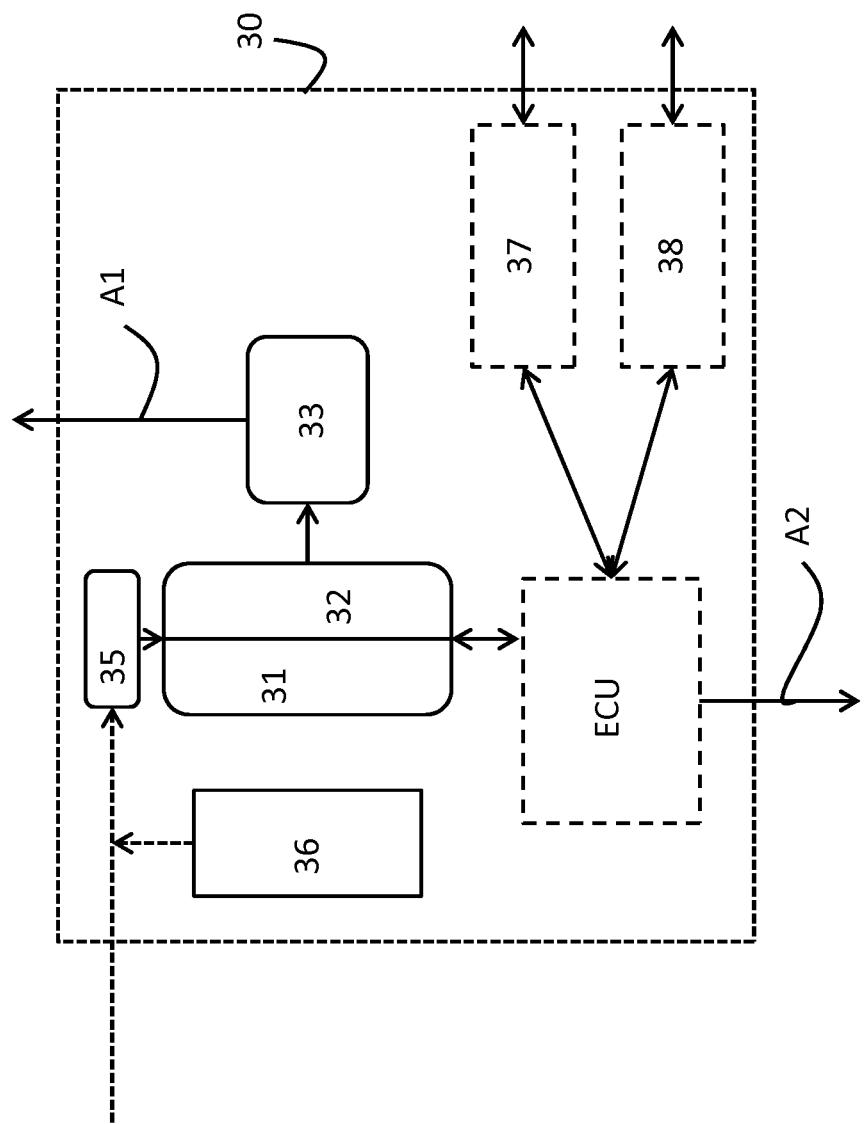
FIG. 3 is a schematic diagram of an example of an electric control system which may be used with the drive arrangement, method and vehicles disclosed herein.

The electronic control system 30 is shown in FIG. 3 and comprises a power source for the propulsion units 12, 22. In the shown embodiment, the power source is an energy storage module 31, in this case a battery, operatively connected with an energy storage monitoring module 32. An inverter 33 is provided between the energy storage module 31 and the propulsion units 12, 22. The output from the inverter 33 is directed to the propulsion units 12, 22 as indicated by the arrow A1. A charge unit 35 is operatively connected with the energy storage module 31 and configured to refuel the energy storage module 31. The charge unit 35 may be fed by an on-board charger 36 such as a combustion engine, secondary battery, fuel cell, momentum charger e.g. brake charging (recuperative braking), or the like. The charge unit 35 may optionally or additionally be fed via an external fuel source such as an electrical or fluid conduit.

An electronic control unit, hereafter referred to as ECU, is operatively connected to the gear boxes 11, 12 so as to govern gear shifting. In FIG. 3 this is indicated by the arrow A2. Further operatively connected with the ECU are vehicle sensor(s) 37 and a communication unit 38. The electronic control system 30 may be differently configured in terms of that one or more of the individual units disclosed above may be optional.

The vehicle sensor(s) 37 is adapted to provide the ECU with data concerning the vehicle status, the ambient environment, vehicle position, and positions of other vehicles for example. The data may be used to determine an appropriate time or scenarios at which the ECU should select a simultaneous gear shifting over a sequential gear shifting or vice versa, or if the ECU should select between a simultaneous gear shifting and a sequential gear shifting. The data may also be used to determine one or more scenarios which trigger simultaneous or sequential gear shifting.

The vehicle sensors 37 may be one or more selected from; steering sensor such as combo sensor steering-torque, HVAC sensor, throttle position sensor, transmission sensor, brake position sensor, headlight range sensor, steering angle sensor, chassis level sensor, brake wear sensor, mirror sensor, passive wheel speed sensor accelerator pedal angle sensor, cross traffic alert, radar such as rear of front radar, rear or front laser radar, tire pressure sensor, collision sensor, pedestrian warning IR sensor, front object radar, drowsiness sensor, ASCD, front object camera, night vision, lane departure sensor, energy storage monitoring unit, GPS, DGPS, 802.11p based sensor, LIDAR, front camera, rear camera, side camera, wheel encoder, on-board unit, emaps, ultrasonic sensor, gyroscope, transmission sensor, coolant sensor, oxygen sensor, mass or vane air flow sensor, speed sensor, EGR position sensor, engine oil and temperature sensor, or the like.

The communication unit 38 is arranged to provide communication capabilities with third parties such as back bone servers, vehicle to vehicle communication, Heavy Vehicle Network Communication and the like. The communication unit may operate via GSM/GPRS communication, Wi-Fi, blue tooth, Dial-up, DSL, broadband, FR-ID, 802.11b, 802.11a/g, 802.11n, UWB (radio frequency), cellular networks such as 3G, 4G, 5G or the like.

Figure 4:
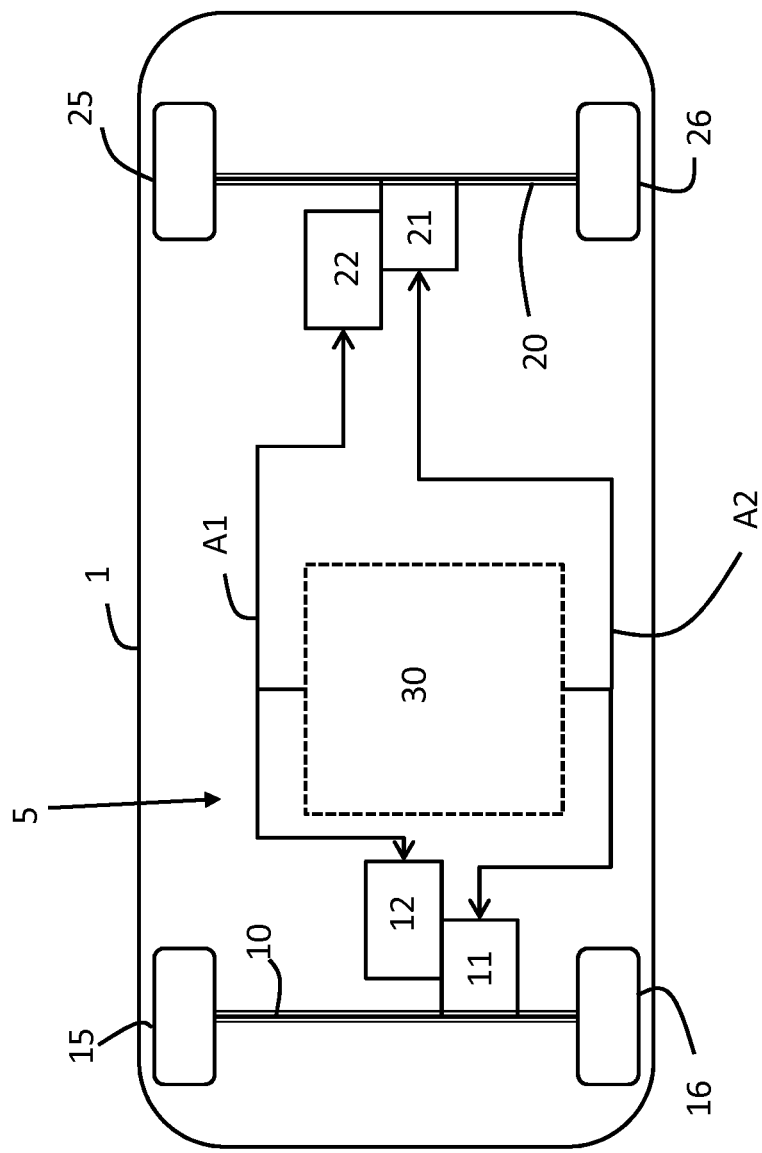
FIG. 4 is a schematic view of a vehicle having a drive arrangement with two drive axles.

FIG. 4 shows an embodiment in which the vehicle 1 comprises a first and a second drive axle 10, 20. In comparison with the embodiment in FIG. 2, the vehicle 1 of FIG. 4 has two axles each operatively connected to a propulsion unit. The drive arrangement 5 comprises a first and a second drive axle 10, 20 each associated with a first and a second wheel 15, 16, 25, 26. Each drive axle 10, 20 comprise a gear box 11, 21 and a propulsion unit 12, 22. The gear boxes 11, 21 may be planetary gear transmissions or standard step gear transmissions. The propulsion units 12, 22 are in this case electrical motors. Each drive axle 10, 20 is thus associated with its own propulsion unit 12, 22 which output power is directed to the drive axle 10, 20 via respective gear box 11, 21 associated with the current drive axle 10, 20. An electronic control system 30, e.g. as disclosed above, is further provided.

With reference to FIG. 4, the drive arrangement 5 permits the vehicle 1 to be driven by both the propulsion units 12, 22 simultaneously or separately. The drive arrangement 5 further enables an automated selection between the gear shifting functions; shifting gear on the first and the second drive axles simultaneously, or sequentially. In practise the drive arrangement 5 can prompt the gear boxes to shift gear simultaneously or sequentially.

Sequential gear shifting enables the drive arrangement 5 to shift gear on one gear box at the time. The vehicle 1 may thus be put in a sequential gear shifting mode. Optionally, when shifting gear sequentially, the first propulsion unit 12 can be operated to generate propulsive torque on the first drive axle 10, as the gear is changed on the other drive axle, i.e. the second drive axle 20. This will balance the torque loss on the second drive axle 20 when shifting gear on the second gear box 21 and provide a smooth comfortable gear transmission for the driver. In a similar manner, the second propulsion unit 22 can be operated to generate propulsive torque on the second drive axle 20 as the gear is changed on the first gear box 11. These operations are performed sequentially and enable the vehicle 1 to be propelled in a smooth and comfortable manner during gear shifting. The gears may be sequentially shifted up, down, neutral to gear, or gear to neutral, forward or reverse.

The drive arrangement 5 also enables a simultaneous gear shifting, as compared to the sequential gear shifting disclosed above. During simultaneous gear shifting, the gears of first and the second gear boxes 11, 21 are shifted at the same time. As the gears are shifted simultaneously, the propulsive torque applied on the drive axles 10, 20 will be applied simultaneously and will affect the vehicle 1 in a different manner as compared to a sequential gear shifting. Just as a matter of example, a vehicle may be perceived to jerk as the propulsive torque is applied simultaneously on both drive axles 10, 20. The gears may be shifted up, down, neutral to gear, or gear to neutral, forward or reverse.

The drive arrangement 5 enables an automated selection between the two gear shifting principles, and thus a drive arrangement which may shift gears both simultaneously and sequentially. The selection between simultaneous gear shifting and sequential gear shifting may be based on one or more parameters. Such one or more parameters maybe provided by one or more sensors such as the vehicle sensors 37 (shown in FIG. 2).

Figure 5:
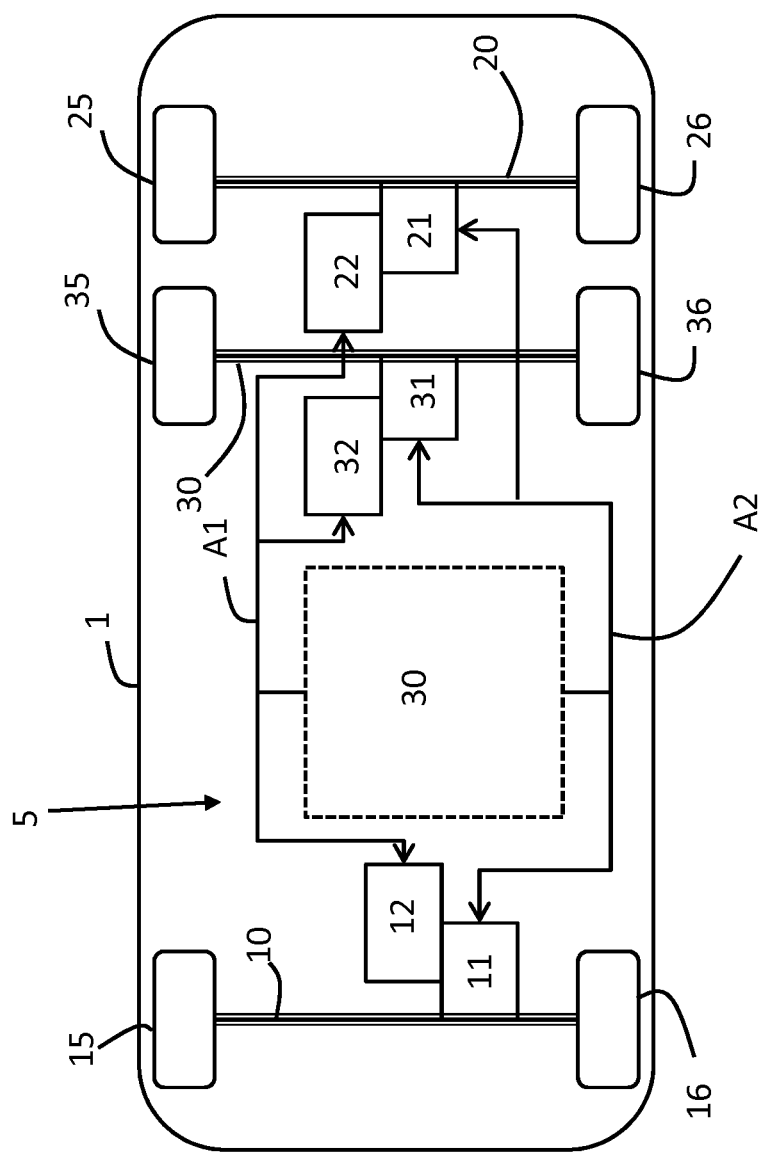
FIG. 5 is a schematic view of a vehicle having a drive arrangement with three drive axles.

FIG. 5 shows a vehicle 1 having a drive arrangement 5 comprising a first, a second and a third drive axle 10, 20, 30 each associated with a first and a second wheel 15, 16, 25, 26, 35, 36. Each drive axle 10, 20, 30 comprises a gear box 11, 21, 31 and a propulsion unit 12, 22, 32. The gear boxes may be planetary gear transmissions or standard step gear transmissions. The propulsion units 12, 22, 32 are in this case electrical motors. Each drive axle 10, 20, 30 is thus associated with its own propulsion unit 12, 22, 32 which output power is directed to the drive axle 10, 20, 30 via respective gear box 11, 21, 31. An electronic control system 30 as disclosed above is further provided.

Just like the other embodiments disclosed above, the drive arrangement 5 permits the vehicle 1 to be driven by all of the propulsion units 12, 22, 32 simultaneously, separately or pair wise. The drive arrangement 5 further enables an automated selection between the gear shifting functions; shifting gear on the drive axles simultaneously, or sequentially. In practise the drive arrangement 5 can prompt the gear boxes to shift gear simultaneously or sequentially. In the shown embodiment, the vehicle 1 comprises three drive axles. When having more than two drive axles, e.g. three drive axles as shown in the FIG. 5, both simultaneous and sequential gear shifting may be performed.

Just as a matter of example, the gear shifting can be performed pair wise, i.e. shifting gear on two drive axles at a time and sequentially afterwards, or before, shifting gear on the remaining drive axle. The second and the third drive axles 20, 30 may be selected for simultaneous gear shifting while the first drive axle 10 may be selected for sequential gear shifting, i.e. before or after the simultaneous gear shifting of the second and the third drive axles 20, 30. The drive arrangement 5 thus enables a wide variety of gear shifting which may be selected between in different scenarios or situations to gain the best performance from the vehicle 1.

Figure 6:
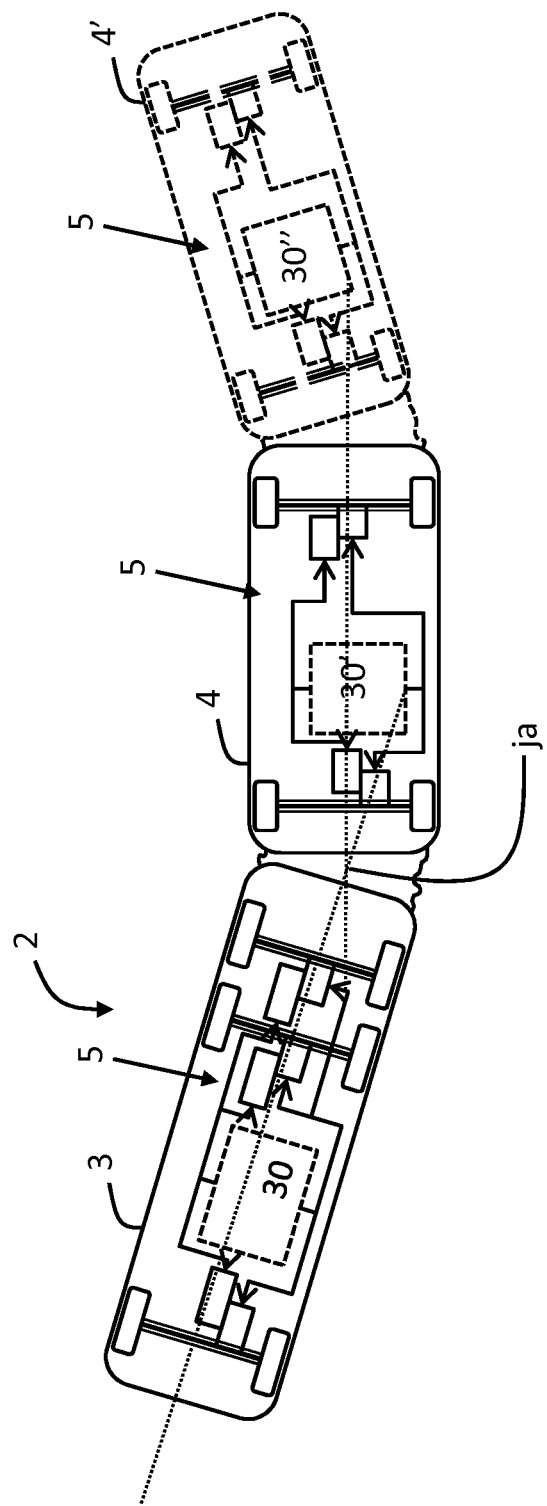
FIG. 6 is a schematic view of an articulated vehicle having two drive arrangements with five drive axles in total. The dashed lines visualizing a bi-articulated vehicle having three drive arrangements with seven drive axles in total.

FIG. 6 shows an articulated vehicle 2, comprising a first and a second vehicle body 3, 4. A third vehicle body 4' is shown with dashed lines simply to illustrate that the articulated vehicle 2 could be a mono-articulated vehicle, a bi-articulated vehicle, or a multiple-articulated vehicle. One or more of the vehicle bodies 3, 4, 4' can be provided with a drive arrangement 5 as disclosed herein. Just as a matter of example, the first vehicle body 3 is provided with a drive arrangement as disclosed with respect to FIG. 5 while the second vehicle body 4 and third vehicle body 4' are provided with a drive arrangement as disclosed with respect to FIG. 4. It should be noted that the drive arrangements may be provided with their own electronic control systems or have one electronic control system. In FIG. 6 the vehicle 1 has a master electronic control system 30, and each vehicle body has a slave electronic control system 30', 30". The master and slave electronic control system 30, 30', 30" may be the same but being controlled differently or they may differ from each other. In practise it may be advantageous if the master electronic control system is the more evolved system in terms of ECU and processing power. Each electronic control system 30, 30', 30" are connected either by cable or wireless connection to enable data communication there between. According to an aspect, the drive arrangement disclosed herein may be provided with multiple drive axles. Vehicles having multiple drive axles, such as articulated vehicles, e.g. a bi-articulated vehicle such as a bi-articulated bus, may thus benefit from the present invention. It should thus also be noted that a vehicle may comprise one or more drive arrangements. The joint angle ja is indicated between the first and the second vehicle body 3, 4. The gear shifting may be set as a function of the joint angle, or one or more joint angles if the vehicle is a multiple-articulated vehicle. The joint angle is 180 degrees or less and limited at the lower end of the range by the vehicles ability to turn. In general, if the joint angle is 170 degrees or less, sequential gear shifting or simultaneous gear shifting may be performed.

Just as a matter of example, gear shifting can be performed pair wise, i.e. shifting gear on two gear boxes at a time and sequentially afterwards, or before, shifting gear on one or more of the remaining gear boxes. It is further possible to select one vehicle body 3, 4, 4' to perform a simultaneous gear shifting of all the vehicle body's gear boxes, with the other vehicle bodies perform a sequential gear shift. With reference to FIG. 6, the first vehicle body 3 of the vehicle 2 may be selected to perform a sequential gear shift, while the second vehicle body 4 of the vehicle 2 may be selected to perform a simultaneous gear shift, or vice versa. Sequential gear shifting may further be performed on a vehicle body level, i.e. a first vehicle body may perform a simultaneous gear shift, which is sequentially followed by a simultaneous gear shift of a second vehicle body. In this manner instead of selecting pairs of gear boxes to synchronize, a first set of gear boxes can be made to perform a simultaneous gear shift while a second set of gear boxes can be made to perform a sequential gear shift. Likewise a first vehicle body can be made to perform a simultaneous gear shift while a second vehicle body can be made to perform a sequential gear shift. The variations of sequential gear shifting are very high and the variations disclosed above are merely to illustrate different possible variations in a non-limiting manner.

Just as matter of example, according to an aspect, when having a plurality of drive axles, a vehicle can be made to perform a sequential simultaneous gear shift, i.e. a first set of gear boxes perform a simultaneous gear shift and a second set of gear boxes perform a simultaneous gear shift. For an articulated vehicle this may be implemented by the first vehicle body performs a simultaneous gear shift and the second vehicle body sequentially thereafter performs a simultaneous gear shift. For a bi-articulated vehicle the first vehicle body may perform a simultaneous gear shift, sequentially after, the second vehicle body performs a simultaneous gear shift and sequentially after the third vehicle body performs a simultaneous gear shift.

According to an aspect, the present invention also relates to a method for shifting gear in a vehicle. Further different scenarios will be described at which the disclosure will be better understood. As mentioned above, the electric control system, such as the electric control system 30 disclosed above, may be used to determine or select an appropriate scenario or parameter which may be used to trigger the selection of simultaneous or sequential gear shifting, i.e. an automatic selecting between shifting gear on at least a first and a second drive axle simultaneously, or sequentially.

Figure 7:
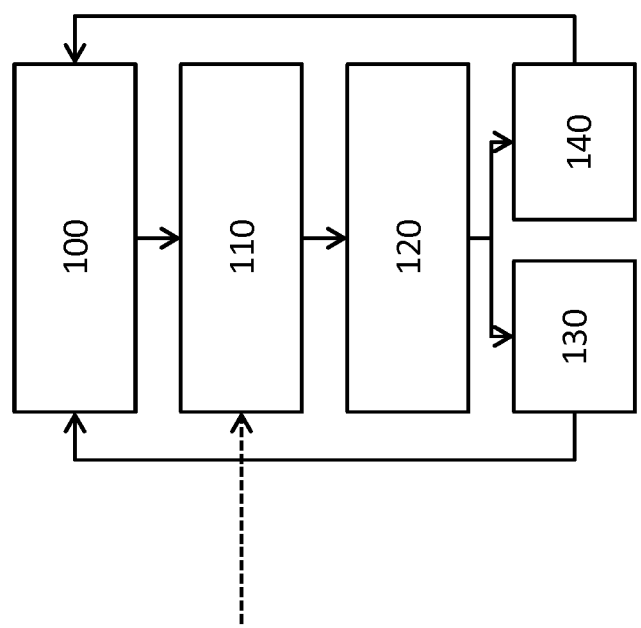
FIG. 7 is a schematic process diagram for selecting a gear shift mode.

FIG. 7 shows a schematic process diagram illustrating a non-limiting embodiment of a method according to the present invention. At step 100 pre-set conditions for gear shifting may be selected. For example, the driver may select between two or more driving modes. Just as a matter of example if a smooth acceleration or deceleration is desired, or optionally a smooth torque output is desired, sequential gear shifting may be selected and as such a 'comfort mode'. If fast gear shifting is desired, simultaneous gear shifting may be selected, or at least partial simultaneous gear shifting may be selected, such mode may be a 'fast mode'. A third optional mode may be an automated mode in which the ECU determines appropriate gear shifting as a function of a prevailing condition.

At step 110, data input, such as sensor input, is received from available sensors and/or communication servers. For example, the vehicle sensors may continuously communicate output signals to the ECU of the vehicle and/or the ECU of the drive arrangement, or search for pre-set parameters.

At step 120 the ECU evaluates the input data and determines if data input corresponds to a prevailing condition or is indicative of a prevailing condition.

If No, at step 130, the ECU does not change or modify the how the gears are shifted, i.e. the gear shift mode is not changed. The method may iterate continuously or intermittently at selected intervals.

If yes, at step 140, the ECU initiates new rules for gear switching, i.e. the gear shift mode is changed.

Different scenarios will be disclosed below as non-limiting examples of how the ECU may operate at step 120 and how the gear shift mode selection may be performed.

Scenario 1
If the driver imparts a continuous increasing propulsive torque, a sequential gear shifting may be selected. This will impart a comfortable and smooth acceleration for the driver. No jerk, or an acceptable jerk, will be recorded and/or perceived.

Scenario 2
If a driver imparts a high level of propulsive torque, i.e. substantially maximizing the imparted propulsive torque, or at least 50% of maximum, at e.g. a low gear, and thereafter reduces the imparted propulsive torque to substantially zero, it may be assumed that the driver do not wish to increase the propulsive torque any further. In such as case, the ECU determines that a simultaneous gear shift is to be selected. A simultaneous gear shifting will in this scenario not affect the comfort of the driver. As substantially no propulsive torque is imparted, no jerk, or an acceptable jerk, will be recorded and/or perceived.

Scenario 3
If the vehicle is in a stand still position, i.e. vehicle speed is zero, and the original gear is neutral for example, a simultaneous gear shift may be selected. It has been found that from a stand still position no jerk, or an acceptable jerk, will be recorded and/or perceived.

Scenario 4
If the driver is braking either using the propulsion unit(s) or brakes, sequential gear shifting may be selected. Once reaching zero speed, simultaneous gear shifting may be selected, see scenario 3.

Sequential gear shifting may be selected due to vehicle dynamic reasons. This may improve the vehicle stability and how the vehicle performs on the road. Sensors which have been deemed specifically important are steering angle sensors, wheel axle load sensors such as the pressure in the dampeners, environmental sensors such as temperature and road and tyre friction sensors.

Scenario 5
If the vehicle is accelerating while turning, e.g. while turning above a predetermined steering angle, sequential gear shifting may be selected. This may prevent the vehicle from losing grip on the road surface due to a smooth gear shifting and thus a more smoothly imparted propulsive torque.

Scenario 6
If the vehicle is accelerating while turning e.g. if the road condition has been determined to be less favourable from a tyre friction point of view may prompt sequential gear shifting. Less favourable road conditions which may affect the tyre friction negative may be due to ice, snow, rubble, oil, or water on the road for example. Sequential gear shifting may thus be selected. This may prevent the vehicle from losing grip on the road surface due to a smooth gear shifting and thus a smoother imparted propulsive torque.

Scenario 7
If the vehicle is "eco-rolling", i.e. free-rolling, sequential gear shift may be selected if the driver is driving on a horizontal road or if speed or acceleration is not prioritized. If the vehicle is free-rolling in a predetermined vehicle speed and it is predicted that the vehicle will accelerate or that a relatively high propulsive torque will be applied within short e.g. based on information from sensors provided to the ECU, a simultaneous gear shift may be selected.

The drive arrangement may in this manner select between gear shifting simultaneously or sequentially as a function of a prioritized parameter. Just as a matter of example, if a smooth acceleration or an even propulsive torque is prioritized, a sequential gear shift is selected. If speed is prioritized, a simultaneous gear shift may be selected.

Figure 8:
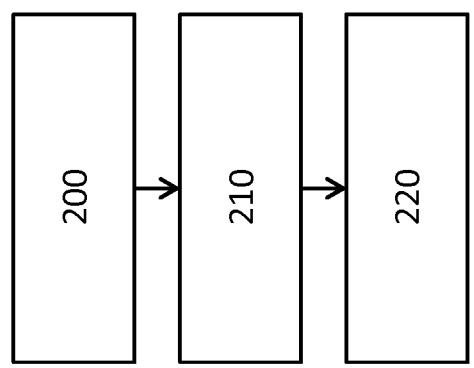
FIG. 8 is a schematic process diagram for selecting a gear sequence.

FIG. 8 shows a schematic process diagram gear shifting as performed by a drive arrangement disclosed herein.

At step 200 the ECU selects a sequential gear shifting, e.g. based on the input data at step 120 of FIG. 7.

As step 210, the ECU determines the sequence in which the gear boxes should be shifted. For example, if the drive arrangement comprises a first, a second and a third gear box, the sequence in which respective gear box shifts gear may be determined based on the input data e.g. based on input from at least one sensor. Just as a matter of example, the gear boxes may be governed to shift gear in order. The first gear box shifts gear first, the second gear box shifts gear secondly and so forth. The gear boxes may be governed to shift gear in reversed order; the n gear box shifts first, the n−1 gear box shifts secondly, and the first gear box shifts last, i.e. n−2 if the drive arrangement comprises three gear boxes. As can be gleaned, the gear boxes may be governed to shift gear in a propagating pattern starting either from the first gear box, the last gear box, or any gear box there between such as by starting by the second gear box in the example mentioned above.

Gear boxes may optionally be gear shifted in pairs. Referring again to the example above, if the drive arrangement comprises a first, a second and a third gear box, the gear boxes may shift gear in a 2+1 sequence or a 1+2 sequence. Hence the gear boxes may be shifted sequentially while shifting at least two gear boxes simultaneously, e.g. like a (n+1)+1 or a 1+(n+1) sequence were n=1, 2, 3, 4, 5, 6, 7, 8 or more. As is understood from the above, substantially any sequence for sequential gear shifting may be selected.

As mentioned above, the sequence in which respective gear box shifts gear may be determined based on input data e.g. based on input from at least one sensor.

It is to be understood that the present invention is not limited to the embodiments described above and illustrated in the drawings; rather, the skilled person will recognize that many changes and modifications may be made within the scope of the appended claims. Just as a matter of example, instead of having planetary gear transmissions or standard step transmissions as mentioned above, other types of transmissions which permit control of gear shifting may be used.

The invention claimed is:

1. A drive arrangement for a vehicle, said drive arrangement (5) comprising at least a first drive axle (10, 20, 30) operatively connected to a first gear box (11) and a first propulsion unit (12), said drive arrangement (5) further comprising a second gear box (21) and a second propulsion unit (22) operatively connected to said first drive axle (10) or to an optional second drive axle (20, 30), said drive arrangement (5) further comprising at least one electronic control unit (ECU) adapted to govern gear transmission of said first and said second gear boxes (11, 21), characterized in that
said drive arrangement comprises at least one sensor (37) and said electronic control unit (ECU) is operatively connected to said at least one sensor (37),
said at least one sensor (37) is adapted to detect a prevailing condition for simultaneous gear shifting or a prevailing condition for sequential gear shifting,
said electronic control unit (ECU) is configured to automatically select simultaneous gear shifting on said first and said second gear boxes (11, 21) if the prevailing condition for simultaneous gear shifting is detected,
said electronic control unit (ECU) is configured to automatically select sequential gear shifting on said first and said second gear boxes (11, 21) if the prevailing condition for sequential gear shifting is detected,
wherein said prevailing condition for simultaneous gear shifting is one or more of the following conditions:
vehicle is free rolling;
high propulsive torque is applied on a low gear and subsequently no propulsive torque is applied, or
vehicle is in a stand still position, and
wherein said prevailing condition for sequential gear shifting is one or more of the following conditions:
vehicle is turning and propulsive torque is applied;
vehicle sensors indicate a tyre friction below a predetermined value or threshold level;
vehicle is accelerating, or
vehicle is decelerating.

2. The drive arrangement according to claim 1, wherein a second drive axle (20) is operatively connected to said second gear box (21) and said second propulsion unit.

3. The drive arrangement according to claim 1, wherein said first and said second gear boxes (11, 22) are stepped transmission gear boxes.

4. The drive arrangement according to claim 1, wherein said propulsion units (12, 22) are electrical motors.

5. The drive arrangement according to claim 1, wherein said drive arrangement comprises at least a third drive axle (30), said third drive axle is operatively connected to a third gear box (31) and a third propulsion unit (32).

6. The drive arrangement according to claim 5, wherein said electronic control unit (ECU) is configured to shift gear on at least said first and said second gear boxes (11, 21) simultaneously and sequentially thereafter shift gear on said third gear box (31).

7. The drive arrangement according to claim 5, wherein said electronic control unit (ECU) is configured to shift gear on said third gear box (31) and sequentially thereafter shift gears on said first and said second gear boxes (11, 21) simultaneously.

8. The drive arrangement according to claim 5, wherein said electronic control unit (ECU) is configured to selectively shift gear on a pair of gear boxes (11, 21, 31) simultaneously.

9. The drive arrangement according to claim 1, wherein said prevailing condition is based on one or more of the following conditions; acceleration, retardation, vehicle speed, amount of propulsive torque applied, gear status, vehicle dynamics, ambient environment conditions, steering angle, joint angle, amount of applied brake torque or the like.

10. The drive arrangement according to claim 1, wherein said at least one sensor is one or more sensors selected from the list of; LIDAR, sonar, radar, IR, camera, GPS device, temperature sensor, tilt sensor, accelerometer, gyrometer, autonomous vehicle drive sensors, steering sensor such as combo sensor steering-torque, HVAC sensor, throttle position sensor, transmission sensor, brake position sensor, headlight range sensor, steering angle sensor, chassis level sensor, brake wear sensor, mirror sensor, passive wheel speed sensor, accelerator pedal angle sensor, cross traffic alert, radar such as rear or front radar, rear or front laser radar, tire pressure sensor, collision sensor, pedestrian warning IR sensor, front object radar, drowsiness sensor, ASCD, front object camera, night vision, lane departure sensor, energy storage monitoring unit, GPS, DGPS, 802.11p based sensor, front camera, rear camera, side camera, wheel encoder, ultrasonic sensor, gyroscope, transmission sensor, coolant sensor, oxygen sensor, mass or vane air flow sensor, speed sensor, EGR position sensor, engine oil and temperature sensor, or the like.

11. The drive arrangement according to claim 1, wherein said prevailing condition is determined as a condition imposed on said vehicle within a predetermined amount of time such as within 10 seconds, 5 seconds or 3 seconds.

12. The drive arrangement according to claim 1, wherein said first drive axle (10) is a front steering axle and said second drive axle (20) is a first rear axle.

13. The drive arrangement according to claim 12, wherein if said drive arrangement comprising an additional third drive axle (30), said third drive axle is a second rear axle (30).

14. The drive arrangement according to claim 1, wherein at least said first and said second drive axles (10, 20) are parallel drive axles.

15. The drive arrangement according to claim 1, wherein at least said first and said second drive axles (10, 20) are each operatively connected with a first and a second wheel (15, 16, 25, 26).

* * * * *